United States Patent
Marra et al.

(10) Patent No.: US 9,243,905 B2
(45) Date of Patent: Jan. 26, 2016

(54) DISTANCE-MEASURING SENSOR AND METHOD FOR SYNCHRONIZING MEASUREMENT VALUE GENERATION AND MEASUREMENT VALUE OUTPUT

(71) Applicant: SICK AG, Waldkirch (DE)

(72) Inventors: Martin Marra, Waldkirch (DE); Reinhard Heizmann, Waldkirch (DE)

(73) Assignee: Sick AG, Waldkirch (DE)

( * ) Notice: Subject to any disclaimer, the term of this patent is extended or adjusted under 35 U.S.C. 154(b) by 445 days.

(21) Appl. No.: 13/778,819

(22) Filed: Feb. 27, 2013

(65) Prior Publication Data

US 2013/0235365 A1    Sep. 12, 2013

(30) Foreign Application Priority Data

Mar. 7, 2012 (DE) .................. 10 2012 101 909

(51) Int. Cl.
- *G01C 3/08* (2006.01)
- *G01S 17/10* (2006.01)
- *G01S 7/483* (2006.01)
- *G01F 23/284* (2006.01)

(52) U.S. Cl.
CPC . *G01C 3/08* (2013.01); *G01S 7/483* (2013.01); *G01S 17/10* (2013.01); *G01F 23/284* (2013.01)

(58) Field of Classification Search
CPC .......... G01C 3/08; G01S 7/483; G01S 17/10; G01F 23/284
See application file for complete search history.

(56) References Cited

U.S. PATENT DOCUMENTS

| | | | |
|---|---|---|---|
| 2011/0202804 A1* | 8/2011 | Sunter | 714/726 |
| 2012/0026508 A1* | 2/2012 | Jiang et al. | 356/511 |
| 2012/0154786 A1* | 6/2012 | Gosch et al. | 356/5.01 |
| 2012/0185209 A1* | 7/2012 | Lewis | 702/159 |

FOREIGN PATENT DOCUMENTS

| | | |
|---|---|---|
| DE | 102007013714 A1 | 10/2008 |
| DE | 202009003002 U1 | 7/2010 |
| EP | 2085841 A1 | 8/2009 |
| EP | 2315045 A1 | 10/2009 |

* cited by examiner

*Primary Examiner* — Luke Ratcliffe
*Assistant Examiner* — Samantha K Abraham
(74) *Attorney, Agent, or Firm* — Nath, Goldberg & Meyer; Jerald L. Meyer; Rury L. Grisham

(57) ABSTRACT

A sensor (10) for determining a distance of an object (18), the sensor (10) transmitting a plurality of transmission pulses via a transmitter (12), accumulating reflected reception pulses (102) in a histogram (110), and determining therefrom a time of flight to the object (18). The sensor (10) has a control (24) for processing and outputting measurement values. Measuring unit (22) and control (24) are mutually connected to pass measurement values and to set a timing for the control (24) via a clocked synchronizing signal in that the control (24) executes a control cycle each time when receiving the synchronizing signal. An output rate of measurement values is programmable by the measuring unit (22) setting a smallest base clock and passing an updated measurement value to the control (24) after a multiple of the base clock corresponding to the programmed output rate.

13 Claims, 2 Drawing Sheets

Figure 1:
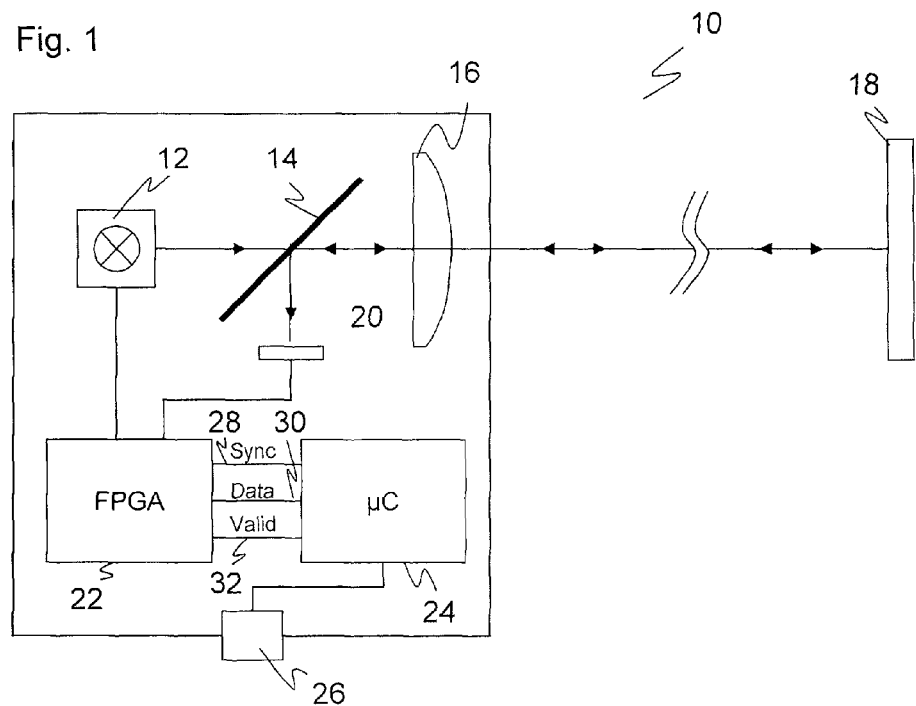

DISTANCE-MEASURING SENSOR AND METHOD FOR SYNCHRONIZING MEASUREMENT VALUE GENERATION AND MEASUREMENT VALUE OUTPUT

The invention relates to a distance-measuring sensor for detecting and determining a distance of an object and a method for synchronizing measurement value generation and measurement value output according to the preamble of claim 1 and 11, respectively Numerous sensors use a signal time of flight principle in which the time interval between transmission and reception of a signal is converted into a distance based on the speed of light. Various frequency ranges of the electromagnetic spectrum such as microwaves and light are utilized. One application of micro waves is fill level measurement. Here, the signal time of flight is determined until reflection at a boundary surface of the medium whose fill level is to be measured. The transmitted microwaves are guided in a probe (TDR, time domain reflectometry), or alternatively freely transmitted, and reflected at the boundary surface.

For optoelectronic sensors according to the principle of a light transit time method, in a pulse based method a short light pulse is transmitted, and the time until reception of a remission or reflection of the light pulse is measured. Alternatively, in a phase based method, transmission light is modulated in its amplitude, and a phase shift between transmission light and reception light is determined, wherein the phase shift is also a measure for the light time of flight. The light time of flight method is also the principle used by distance-measuring laser scanners whose scanning beam measures a line or even a surface. Optoelectronic distance measurement can for example be required in vehicle safety, in logistics or factory automation, or in safety technology. Often, the desired output value is the measured distance. Alternatively, a distance-measuring device according to the light time of flight method can also operate as a switch detecting a distance variation of a reflector or a reflecting or remitting object expected in a certain distance. One particular application is a reflective light barrier monitoring the distance to its reflector.

In switching systems, and increasingly also in measuring systems, the synchronicity of the measurement generation and the measurement output is an important quality criterion. For example, a constant delay between actual measurement situation and measurement value is important in applications in which the sensor operates as part of a control loop. In other applications, the velocity or acceleration of measured objects is estimated based on the output rate of distance measurement values and the distance variation is determined therefrom. Any inaccuracy in the relation of measurement value and output time of the measurement value leads to sometimes significant errors. An additional error is caused by the sensor usually outputting measurement values with a sensor clock which does not correspond to the system clock of the application receiving the measurement values. The influence of such asynchronicity should remain as low as possible.

An internal synchronization is added to the difficulties of synchronization between sensor and its external environment if the sensor has a separated measurement value generation and measurement value processing. For example, an internal control of a sensor may access a measuring unit of the sensor to read out, process, and output measurement values. This access is subject to the requirements of the operating system of the internal control and not to the internal processing times of the measuring unit, so that such read outs may be cyclic, but are not synchronous with the measurement value generation. Thus an internal asynchronous interface is added to the asynchronous external measurement access.

The easiest way, in principle, to reduce the influence of asynchronicity is a very fast measurement value generation. Due to physical conditions of the measurement itself and limited evaluation resources, this can rarely be sufficiently ensured. This is particularly true if, for an improved signal-to-noise ratio, no individual events are evaluated, but a plurality of measurement pulses are transmitted, received, and accumulated in a histogram for a statistical method, as known for example from DE 10 2007 013 714 A1. Here, either range or robustness can be significantly increased via the averaging depth of the histogram, i.e. the number of events forming the histogram. However, at the same time it lasts at least as long until a new measurement value is available as a number of measurement pulses corresponding to the averaging depth subsequently needs on the route between sensor and object.

It is also known in the prior art to output the time of the measurement generation as a "time stamp" together with the measurement value. This approach is discussed for example in EP 2 085 841 B1. The output interface has to provide the required transmission capabilities as for example in a digital interface. However, for simple, switching sensors, or sensors with an analog distance output, this is difficult or impossible. In addition, the system where the sensor is integrated has to be able to evaluate the time stamp. For an internal synchronization of different evaluation stages of the sensor, a time stamp is not really useful.

It is therefore an object of the invention to resolve the synchronization problems in a sensor having at least a two-level measurement value generation and measurement value processing.

This object is satisfied by a distance-measuring sensor for detecting and determining a distance of an object, the sensor having a transmitter for transmitting transmission pulses, a receiver for generating reception pulses from the transmission pulse reflected by the object, a measuring unit configured to transmit a plurality of transmission pulses via the transmitter, to accumulate the reception pulses thus generated in the receiver in a histogram, and to determine therefrom a reception point in time and thus a measurement value for a signal time of flight from the sensor to the object, the sensor further having a control for flow control in the sensor and for processing and outputting the measurement value, wherein measuring unit and control are mutually connected to pass measurement values from the measuring unit to the control and to set a timing for the control by the measuring unit via a clocked synchronizing signal in that the control executes a control cycle each time when receiving the synchronizing signal, wherein an output rate of measurement values is programmable in the control by the measuring unit setting a smallest base clock and passing an updated measurement value to the control after a multiple of the base clock, the multiple corresponding to the programmed output rate.

The object is also satisfied by a method for synchronizing measurement value generation and measurement value output in a distance-measuring sensor having a measuring unit configured as a measurement generating unit determining a distance of an object in that a plurality of transmission pulses is transmitted and the reception pulses subsequently generated from the reflected transmission pulses are accumulated in a histogram and a reception point in time and thus a measurement value for a signal time of flight is determined therefrom, and the sensor having a control configured as a measurement processing unit controlling the flow in the sensor and processing and outputting the measurement value, wherein the measuring unit sets a timing of the control via a clocked synchronizing signal in that the control executes a control cycle each time when receiving the synchronizing signal, wherein the measuring unit sets the synchronizing signal with a smallest base clock and passes a respective updated measurement value to the control after a multiple of the base clock, the multiple corresponding to an output rate of the measurement values, so that the timing of the control remains stable even after reprogramming the output rate.

The invention starts from the basic idea to set the timing by a measuring unit. This measuring unit as a measurement generating instance successively transmits a plurality of transmission pulses via a transmitter and converts the transmission pulses reflected by an object into reception pulses in a receiver which are accumulated in a histogram for statistical evaluation. Therefrom, the measuring unit determines a reception point in time and thus a signal time of flight as a measurement value. In addition, the measuring unit sets a timing of a control for flow control in the sensor and for processing and outputting the measurement value, which serves as a measurement processing unit, via a clocked synchronizing signal, so that the control executes a respective control cycle in response to the synchronizing signal. During such a control cycle, in addition to the measurement value processing, i.e. for example a conversion of a signal time of flight into a distance, a setting of a correct number format for the output, or a preparation for an external output protocol, other sensor tasks can also be processed, such as control of input devices, display devices, external interfaces, or safety functions.

The synchronization signal is output by the measuring unit with a smallest base clock. The measuring unit provides a measurement value after a respective multiple of the base clock, where the multiple may also be one in the limiting case. Thus, the output rate of the measurement values is programmable without the need of altering the base clock which would severely interfere with the internal timing and prevent the control to properly perform its other tasks. The base clock preferably corresponds to the shortest time interval during which the control can handle one cycle of the control flow. Here and below, the term preferably refers to an advantageous, but completely optional feature. The correspondence does not need to be exact, for example to maintain numbers for the base clock which still can be handled, but a significant delay as compared to this shortest time interval does not optimally use the resources of the control.

The invention has the advantage that the internal synchronicity of the sensor is ensured and this source of error is thus excluded. At the same time, the rate of the measurement value generation becomes a freely adjustable parameter in spite of the measuring unit setting the timing and depending on this output rate in its own measurement value generation cycles. The synchronicity is still ensured. An adjustable output rate of measurement values means that the time for the generation of a measurement value is variable, and this variable time can be used by the measuring unit to operate with different averaging depths, i.e. a different number of repetitions of transmitting and receiving pulses in the generation of histograms. Hence, the user has the opportunity to weigh a tradeoff between range and robustness on the one hand and a short response time on the other.

The measuring unit is preferably implemented on an FPGA (Field Programmable Gate Array). The control is preferably implemented on a microcontroller. That way, digital components are used that can show their strength for the respective task. An FPGA is suitable for the fast processing of large amounts of data with relatively simple processing steps. A microcontroller is slower for these tasks, but considerably more flexible in programming and provided with more powerful instruction sets for more complex calculations. Alternatively, other known digital components can be used both for the measuring unit and for the control.

The measuring unit preferably passes status data to the control with each base clock. Data are thus exchanged independent of the output rate with the comparably fast base clock. In order to keep the transmission independent of the output rate, measurement values can also be passed each time, even if between two points in time given by the output rate these measurement values are no completely up to date, i.e. have already been output earlier.

The measuring unit preferably passes an update signal to the control when a new measurement value is determined. The measuring unit thus also controls the timing with respect to the programmable output times of the measurement value output. The update signal is particularly useful if measurement values are passed with each base clock as described in the previous paragraph. Then, the control recognizes from the update signal whether this measurement value is a new one or one that was already known.

The sensor preferably has a parameterization interface for setting or changing the output rate and thus an averaging depth of the histogram for the signal time of flight determination in the measuring unit. This makes use of the flexible decoupling of internal synchronization and external output of the measurement values. This gives the user the possibility to specify an averaging depth for the measuring unit and thus make a tradeoff whether rather a high range and robustness, respectively, or rather a fast response time is desired.

The control is preferably configured to output the measurement value as a distance value to the object via an output interface of the sensor. This is an actual distance measurement, where the signal time of flight is converted into a distance via the speed of light and possible calibration settings considering processing times and sensor dimensions, and the distance is output.

The control is preferably configured to set a binary object detection signal at a switching output of the sensor depending on whether there is an object in a predefined distance to the sensor. Here, as an alternative or in addition to an output of the distance value, it is monitored whether an object appears or remains in an expected distance or distance interval. From that, for example the manipulation of the reflector of a reflective light barrier can be detected.

The sensor is preferably configured as an optoelectronic sensor, wherein the transmitter is a light transmitter and the receiver is a light receiver. Such light-based sensors are often used for distance measurements. They can be one-dimensional, i.e. directed at a measuring object. Another possible embodiment is a laser scanner, where the direction in which the transmission pulses are transmitted is periodically varied for example by means of a rotating mirror, so that a monitoring plane or even a spatial region can be scanned. An example for an alternative sensor which is not based on optical signals is a TDR level sensor.

The inventive method can be modified in a similar manner and shows similar advantages. Such advantageous features are described in the sub claims following the independent claims in an exemplary, but non-limiting manner.

Figure 2:
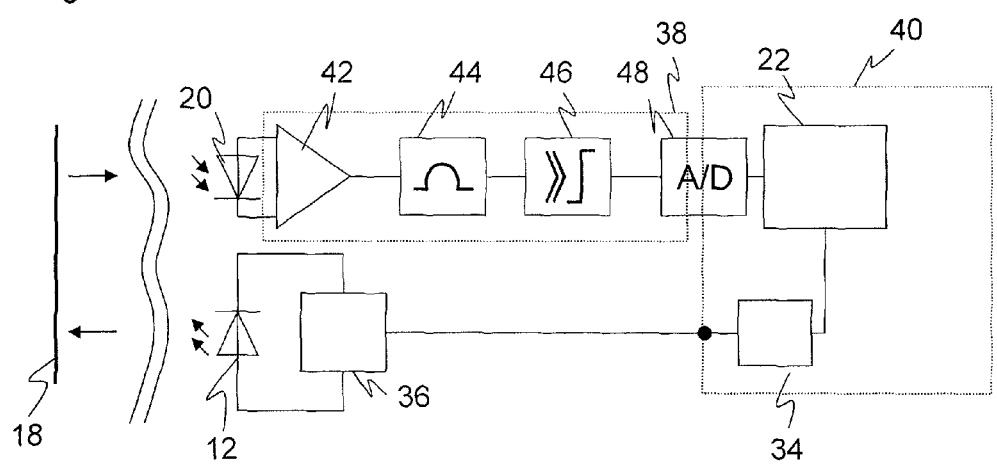
Figure 3:
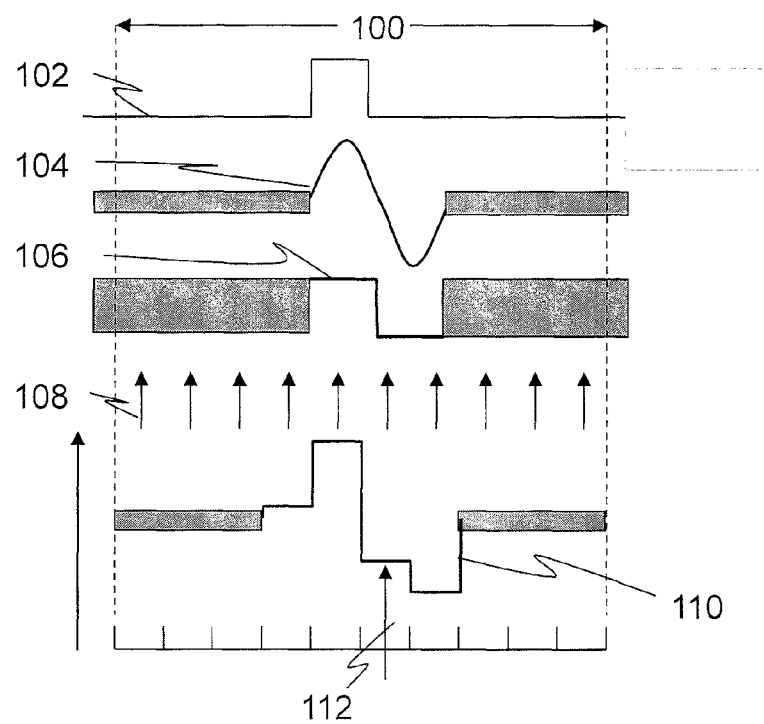

The invention will be explained in the following also with respect to further advantages and features with reference to exemplary embodiments and the enclosed drawing. The Figures of the drawing show in:

FIG. 1 a block diagram of a distance-measuring sensor having a measuring unit and a control;

FIG. 2 a block diagram of the measuring unit for the signal processing in the sensor according to FIG. 1; and FIG. 3 a schematic representation of the signals in different stages of processing for explaining an evaluation method based on forming a histogram.

FIG. 1 shows a block diagram of a distance-measuring sensor 10 in an exemplary embodiment as a one-dimensional optoelectronic distance scanner. A light transmitter 12 is oriented so that its transmission light transmits a beam splitter 14 and subsequently passes into a monitoring area via optics 16. There, if an object 18 is present in the beam path, the transmission light is reflected or remitted from the object 18 and returns, again through the optics 16, to the beam splitter 14, where it is reflected into and detected by a light receiver 20. The beam splitter 14, in both light directions, also generates unwanted light portions by reflection on the transmission light path and transmission on the reception light path, respectively, which light portions are preferably absorbed. This arrangement based on a beam splitter is meant purely by way of example, the invention also covers other arrangements such as double-eyes. Likewise, the explanation based on a one-dimensional sensor is meant to be only an example. The sensor 10 may also be a more-dimensional system, such as a laser scanner, or operate with completely different electromagnetic signals, such as a TDR level sensor.

A measuring unit 22, for example implemented on an FPGA, controls the light transmitter 12 and evaluates signals of the light receiver 20. In order to determine a light time of flight for a distance measurement of the object 18, light pulses are transmitted and received again, and the difference between transmission time and reception time is determined. However, this evaluation is not done on the basis of individual events of only one single light pulse, but in an evaluation by means of a histogram which is formed by a plurality of individual events. This statistical evaluation will be further explained below with reference to FIGS. 2 and 3, but it is sufficient for an understanding of the invention that there is the possibility due to the statistical approach to detect more individual events with a longer measurement time and thus make a measurement more robust against interference.

In addition to the measuring unit 22 forming a measurement generating unit, a control 24 for example implemented on a micro controller is provided as a measurement processing unit. Control 24 receives and further processes measurement values of measuring unit 22, for example by a conversion into desired units of the distance measurement or a conversion into a number format externally desired, and theses values are output via an interface 26. Interface 26 can also be representative for different or a plurality of digital and analog interfaces. For example, in an embodiment, the control 24 checks whether there is an object 18 in a certain distance range, and sets a corresponding binary object detection signal at a switching output. Control 24 also has other tasks in the flow control of the sensor 10 in addition to measurement value acquisition. These may include reading out control elements like buttons, operating display elements like LEDs or other displays, safety functions like evaluation of laser safety and temperature as well as controlling and ensuring temporal consistency at external interface 26.

The measurement value acquisition cycle in the measuring unit 22 and a control cycle of the control 24 do not initially correspond to each other. This is not even readily possible, because the duration of acquisition of a measurement value depends inter alia on the averaging depth. Conversely, the control 24 needs a minimum duration for its control cycle, given its limited calculation resources as they are usually only available, in particular in simpler sensors 10. However, in a preferred embodiment of the invention, it is possible to parameterize the output rate at which the sensor 10 provides updated measurement values at the interface 26.

To this end, synchronicity is provided in the sensor 10 in that the measuring unit 20 sets a base clock for the control 24 and its operating system via a synchronization line 28. The sensor 10 thus is made as a source-synchronous unit with a constant delay time and an output rate synchronous to the measurement values, respectively.

However, the base clock should not directly correspond to the output rate of the measurement values, because the output rate should be parameterizable via an interface of the sensor 10 which is not shown. Then, output rate and base clock are only the same in the one case where the output rate is just parameterized with the value of the base clock. One cannot change the base clock upon variation of the output rate because this has far-reaching adverse consequences for the control tasks of control 24 mentioned above, affecting input or output elements, safety functions, and interfaces of the sensor 10.

Therefore, the base clock is maintained constant as a "time tick" or "heartbeat" of the sensor 10, regardless of the physical measurement rate in the measuring unit 22. A base statistic having a certain number of individual events which the measuring unit 22 can process within one cycle of the base clock is determined. This is sort of the smallest statistical unit the measuring unit 22 uses. The base clock with a cycle time of for example 1 ms also forms the time frame for the control 24.

The output rate for measurement values can be set to the minimum value of the base clock. The base clock is preferably set so fast that the capacity of the control 24 is just enough to handle its task at that rate. An even faster output rate is not limited by the base clock, but the output rate set as the base clock is anyway the best sensor 10 can do. On the other hand, slower output rates can deliberately be set, for example in a range of 1 ms to 0.25 s or any other range starting form the base clock. This can on the one hand be done to provide an adaption to a clock of an external system. On the other hand, due to the statistical evaluation method, a slower output rate does not only have the disadvantage of a lower response time, but also the advantage of a higher averaging depth and thus an improved range and robustness, respectively. This is not merely a downstream averaging of sequentially acquired measurement values, but a higher physical integration leading to an actual and significant improvement of the measurement. In many applications, these benefits outweigh the reduced response time which often is of no consequence.

The output rate is adjusted in multiples of the base clock. Correspondingly, measuring unit 22 processes a multiple of the base statistic in a histogram of increased averaging depth. In order to facilitate digital processing, in an embodiment not all multiples of the output rate, but only multiples scaled by a factor of $2^n$ can be parameterized. This allows scaling of the internal parameters of the FPGA for the measurement generation, like threshold values and the like, by a simple bit shift rather than having to use operations like multiplication and division, which an FPGA typically does not optimally support and which in any case require more resources.

All calculations and control functions of control 24 are processed once in a cycle of the base clock. The measuring unit 22 provides the most recent measurement value and optionally additional data of the measuring unit 22 on a data line 30 to the control 24 once per cycle of the base clock. The measurement value is not necessarily up to date in case the parameterized output rate is slower than the base clock. Therefore, on an additional line 32, an update signal is transmitted from the measuring unit 22 to the control 24 as soon as the measurement value is again up to date, and thus valid. The three lines 28, 30, 32 for the base clock, the data, and the update signal are separated mostly for simple presentation. In other embodiments, a common line can be used instead. For update signal, for example, becomes merely one bit in a digital protocol of the data transfer.

Finally, with reference to FIGS. 2 and 3, an exemplary measurement method in the measuring unit 22 is explained, where the method is based on a histogram formed by a plurality of measurement pulses which are transmitted and again received. FIG. 2 shows a block diagram of the measuring unit 22, the transmitter 12 and the receiver 20, and several additional elements for their control and analog preprocessing.

In a transmission path, in addition to the actual transmitter 12 also a delay device 34 and a driver circuit 36 are provided, while in a reception path the receiver 20 feeds the reception signal to the measuring unit 22 via an analog preprocessor 38. The transition of analog to digital signals is shown by a dashed line 40.

The analog preprocessor forms a multistage processing path. It starts with an amplifier 42, for example a transimpedance amplifier, which receives and amplifies the signal of the receiver 20. A downstream Filter 44, for example a band pass filter or a differentiator, converts the unipolar signal of the pulse into a bipolar pulse. Amplifier 42 and Filter 44 may also be connected in reverse order. As a next preprocessing stage, a limiting amplifier 46 is provided which amplifies so far and subsequently clips the amplitude that the pulse signal becomes a rectangular pulse driven into saturation. This signal, in a final preprocessing stage, is fed to an A/D converter 48, in particular a binarizer, which does not convert the amplitude into a digital integer value, but merely into a binary value. A/D converter 48 preferably is not a separate component, but implemented via the inputs of the FPGA of measuring unit 22 with simple, upstream analog R or RC networks.

The signal and evaluation path through the components as described above is now explained with reference to FIG. 3. A statistical evaluation of a plurality of individual events is provided because the signals of an individual measurement are far too noisy to reliably determine reception times.

The light transmitter 12 generates a respective individual light pulse in each measurement period 100 which enables the determination of a precise point in time. A rectangular pulse is suitable for this purpose, but other pulses are also conceivable, such as a Gaussian pulse, a multimodal Signal for example for a coded assignment of each signal, and also steps. All these signal shapes are referred to as pulses in the following.

The pulse is reflected at the target object 14 and, after conversion into an electrical signal in the receiver 20, amplified in amplifier 42. The resulting amplified electrical signal is shown in idealized form, under realistic conditions the reception pulse 102 would not be a clear rectangle, but would show transients at the edges and an overall noise.

In the filter 44, the unipolar reception pulse 102 is converted into a bipolar signal 104. This can be implemented with a band pass filter of suitable filter frequency. Gray rectangles are shown next to the bipolar signal 104 symbolizing the noise level. In practice, the noise level may exceed the amplitude of the amplified signal. Moreover, only one sine oscillation of the bipolar signal 104 is shown. Secondary oscillations, i.e. additional sine periods with increasingly dampened amplitude, are omitted for a simplified representation. Of course, no clear sine can always be expected, but a curve having a maximum and a minimum.

In the limiting amplifier 46, the bipolar signal 104 is amplified to an extend that, after cutting off, the actual signal becomes a rectangular edge 106, and that the noise level shown by gray rectangles is extended in its amplitude over the entire dynamic range.

The rectangular edge 106 is sampled in the A/D converter 48 with a sampling rate of for example 2.5 ns. This sampling rate is symbolized in FIG. 3 by arrows 108. The resulting bit sequence, with the specified values one bit per 2.5 ns, is used in the measuring unit 22 to form a histogram 110. For each bin having a width of 2.5 ns corresponding to the sampling rate, one accumulator is provided which is only incremented for a corresponding bit value "1".

For ideal, noiseless signals only that bin of this histogram 110 would be filled up that matches the position of the rectangular edge 106. However, the noise level, raised by limiting amplifier 34, also fills up the other bins, namely, statistically once every other measurement period 100 due to the randomness of the noise.

If the method as described is iterated and the histogram 110 formed over k measurement periods 100, the bins are filled with approximately the value k/2 due to the noise, where statistical fluctuations are to be added. This value of k/2 corresponds to a signal value zero due to the binarization. From that background, the maximum formed by the positive part of the bipolar signal 104 rises upwards, and the corresponding minimum shows downwards. Together with the secondary oscillations, which are not shown, the histogram shows a characteristic profile whose signature is used by the measuring unit 22 to determine the reception time. The statistical evaluation of a plurality of individual measurements makes this possible even if the individual measurement in a measurement period 100 does not allow a reliable distance determination due to excessive noise.

The reception point in time can be determined by the first zero crossing from maximum to minimum. In FIG. 3, this zero crossing is located in the bin marked with an arrow 112. The temporal accuracy of this information is initially limited to the resolution of the histogram 110, i.e. for example to 2.5 ns, and therefore directly, coupled to the sampling rate of A/D converter 48. By various techniques, this resolution can be increased, which however will not be discussed in more detail in this context.

The invention claimed is:

1. A distance-measuring sensor (10) for detecting and determining a distance of an object (18), the sensor (10) comprising:

a transmitter (12) for transmitting trans-mission pulses;

a receiver (20) for generating reception pulses (102) from the transmission pulse reflected by the object (18); and a measuring unit (22) configured to transmit a plurality of transmission pulses via the transmitter (12), to accumulate the reception pulses (102) thus generated in the receiver (20) in a histogram (110), and to determine therefrom a reception point in time (112) and thus a measurement value for a signal time of flight from the sensor (10) to the object (18);

a control (24) for flow control in the sensor (10) and for processing and outputting the measurement value, wherein measuring unit (22) and control (24) are mutually connected to pass measurement values from the measuring unit (22) to the control (24) and to set a timing for the control (24) by the measuring unit (22) via a clocked synchronizing signal in that the control (24) executes a control cycle each time when receiving the synchronizing signal, and an output rate of measurement values is programmable in the control (24) by the measuring unit (22) setting a smallest base clock and passing an updated measurement value to the control (24) after a multiple of the base clock, the multiple corresponding to the programmed output rate.

2. The sensor (10) according to claim 1, wherein the measuring unit (22) is implemented on an FPGA.

3. The sensor (10) according to claim 1, wherein the control (24) is implemented on a microcontroller.

4. The sensor (10) according to claim 1, wherein the measuring unit (22) passes status data to the control (24) with each base clock.

5. The sensor (10) according to claim 1, wherein the measuring unit (22) passes an update signal to the control (24) when a new measurement value is determined.

6. The sensor (10) according to claim 1, further comprising a parameterization interface for setting or changing the output rate and thus an averaging depth of the histogram (110) for the signal time of flight de-termination in the measuring unit (22).

7. The sensor (10) according to claim 1, wherein the control (24) is configured to output the measurement value as a distance value to the object (18) via an output interface (26) of the sensor (10).

8. The sensor (10) according to claim 1, wherein the control (24) is configured to set a binary object detection signal at a switching output (26) of the sensor (10) depending on whether there is an object (18) in a predefined distance to the sensor (10).

9. The sensor (10) according to claim 1, wherein the sensor (10) is configured as an optoelectronic sensor, wherein the transmitter (12) is a light transmitter and the receiver (20) is a light receiver.

10. The sensor (10) according to claim 9, wherein the sensor (10) is a laser scanner.

11. A method for synchronizing measurement value generation and measurement value output in a distance-measuring sensor (10) comprising:

a measuring unit (22) configured as a measurement generating unit determining a distance of an object (18) in that a plurality of transmission pulses is transmitted and the reception pulses (102) subsequently generated from the reflected transmission pulses are accumulated in a histogram (110) and a reception point in time and thus a measurement value for a signal time of flight is determined therefrom, and the sensor (10) having a control (24) configured as a measurement processing unit controlling the flow in the sensor (10) and processing and outputting the measurement value, wherein the measuring unit (22) sets a timing of the control (24) via a clocked synchronizing signal in that the control (24) executes a control cycle each time when receiving the synchronizing signal, wherein the measuring unit (22) sets the synchronizing signal with a smallest base clock and passes a respective updated measurement value to the control (24) after a multiple of the base clock, the multiple corresponding to an output rate of the measurement values, so that the timing of the control (24) remains stable even after reprogramming the output rate.

12. The method of claim 11, wherein the output rate of the measurement values is programmed by setting the output rate to a multiple of the base clock.

13. The method of claim 12, wherein the measuring unit (22) uses an altered time interval between two measurement values to generate and evaluate a histogram (110) having an adapted averaging depth by a correspondingly adapted number of repetitions of transmitted and received transmission pulses.

* * * * *